United States Patent [19]

Matsueda et al.

[11] Patent Number: 5,734,704
[45] Date of Patent: Mar. 31, 1998

[54] COMMUNICATION APPARATUS FOR COMMUNICATING IN ACCORDANCE WITH INFORMATION IDENTIFYING DEVICE MANUFACTURER

[75] Inventors: Kazutaka Matsueda; Hiroshi Nobuta, both of Yokohama; Koichi Matsumoto, Tokyo, all of Japan

[73] Assignee: Canon Kabushiki Kaisha, Japan

[21] Appl. No.: 538,573

[22] Filed: Oct. 3, 1995

[30] Foreign Application Priority Data

Oct. 5, 1994 [JP] Japan .................................. 6-268377

[51] Int. Cl.⁶ .................................................. H04M 11/00
[52] U.S. Cl. .................................. 379/100.14; 379/93.32; 358/434; 358/438
[58] Field of Search .................................. 379/100, 96–99, 379/93, 354–357, 100.01, 100.06, 100.13, 100.14, 100.17, 93.29, 93.31, 93.32, 93.34; 358/400, 434–442, 468, 406

[56] References Cited

U.S. PATENT DOCUMENTS

| 5,165,096 | 11/1992 | Matsumoto . |
| 5,268,770 | 12/1993 | Yukino ..................... 358/435 |
| 5,270,834 | 12/1993 | Kuwahara ................ 358/440 |
| 5,517,324 | 5/1996 | Fite, Jr. et al. ........... 358/434 |

FOREIGN PATENT DOCUMENTS

| 6-14175 | 1/1994 | Japan ...................... 379/100 |

*Primary Examiner*—Wing F. Chan
*Attorney, Agent, or Firm*—Fitzpatrick, Cella, Harper & Scinto

[57] ABSTRACT

A plurality of manufacturer identifiers handlable by its own device are registered, and a manufacturer identifier included in a signal from a communicating station is one handlable by its own device, a code corresponding to the manufacturer identifier of the communication station is sent to the communicating station so that a special function adopted by the manufacturer can be compatibly used.

22 Claims, 24 Drawing Sheets

FIG. 8

| MAKER CODE | AVAILABLE FACULTY | | | |
|---|---|---|---|---|
| CODE A | CONFIDENTIAL | ABBREV NAME NOTICE | RELAY | HIGH RESOLUTION |
| CODE B | CONFIDENTIAL | ABBREV NAME NOTICE | | |
| CODE C | CONFIDENTIAL | HIGH RESOLUTION | RELAY | |
| CODE D | CONFIDENTIAL | ABBREV NAME NOTICE | RELAY | |
| ... | | | | |
| CODE X | HIGH RESOLUTION | | | |

FIG. 11

| COMMUNICATION MAKER CODE | MAKER CODE X |
|---|---|

| MAIN MAKER CODE | MAKER CODE B |
|---|---|
| SUB-MAKER CODE | MAKER CODE C |

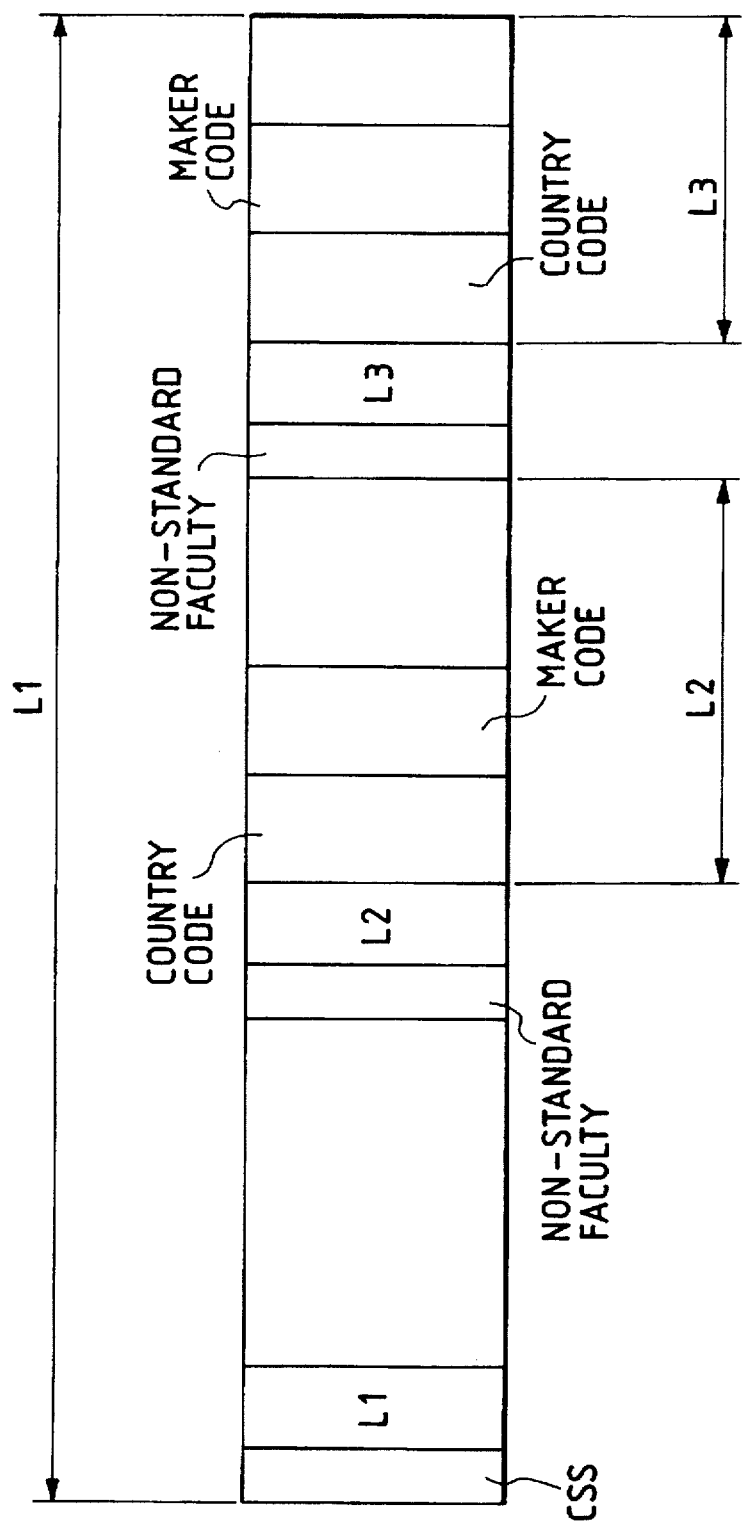

COMMUNICATION APPARATUS FOR COMMUNICATING IN ACCORDANCE WITH INFORMATION IDENTIFYING DEVICE MANUFACTURER

BACKGROUND OF THE INVENTION

1. Field of the Invention

The present invention relates to a communication apparatus for inter-terminal communication such as a facsimile device in which a communication control protocol is executed by utilizing manufacturer identification information for identifying a manufacturer of a device.

2. Related Background Art

As the performance of communication is improved recently, the international standardization of the communication standard has been attempted by the ITU and multifunction standards are defined from time to time. Particularly, in the ITU-T T.30 Recommendation, communication of complex functions may be conducted without regard to the manufacturers of the communication terminals by commands such as DIS/DCS/DTC.

On the other hand, in order to respond to user requests, it is common to conduct a unique operation between devices of the same manufacturers by negotiating functions unique to the manufacturer by using NSF, NSC and NSS.

However, there is a case where manufacturers using the above functions jointly develop a device. In such a case, it is required that the resulting device is compatible in communication function with other devices of either manufacturer.

Further, there is a case where a first manufacturer supplies a product to a second manufacturer who adds functions thereto and markets it. In such a case, again, it is required to attain compatibility of communication functions with other devices of the first and second manufacturers.

However, since there is no means today to designate a plurality of manufacturer codes in one communication, it is not possible to maintain the compatibility for all communication functions between the devices of the above cases or between such devices and other devices.

Referring to FIGS. 4 to 7, this will be explained in detail.

For example, in the G3 communication, a manufacturer code is designated in the frame NSF, NSS or NSC at an area following to an area of a country code in accordance with the ITU-T Recommendation T.30.

Once the manufacturer code is designated, it is a manufacturer's option to designate what functions in the frame and a data structure in the frame is usually not open to other manufacturers.

FIG. 4 shows a normal sequence in G3 for one-page transmission.

As shown, a called station responds to CNG from a calling station by NSF and DIS to designate available functions of the called station. After the calling station receives the frame, it sends NSS and DCS followed by training and CFR further followed by a transfer phase of image data.

FIG. 6 shows a structure of the NSF frame used in FIG. 4. In FIG. 6, a HDLC frame type used in the T.30 Recommendation is adopted. Namely, the first and last bytes are flag bytes, and an address field (A), a control field (C), an FCF field (NSF in FIG. 6) for indicating a frame ID and parameters following to the FCF field are provided.

Two bytes before the last byte form a flag check sequence (FCS) field for detecting an error in the frame. In FIG. 6, a country code is provided at the top of the parameter field followed by a manufacturer or maker code.

An example in the G4 facsimile is explained. FIG. 5 shows a protocol above the layer 4 of a channel B of a G4 facsimile connected to ISDN.

TCR/TCA which is a connection protocol for the layer 4 is communicated, and a calling station sends CSS and a called station sends RSSP for CSS. For the RSSP, CDCL is sent from the calling station and for the CDCL, RDCLP is sent from the called station as negotiation for a document to be transmitted.

Then, a CDS command for indicating the document to be transmitted is sent from the calling station. After the CDS, a protocol for the layer 6 and above is started and the image data is carried.

In the G4 protocol, the use of the manufacturer code is permitted in the CSS/RSSP and even CDCL/RDCL. FIG. 7 shows an example thereof, that is, a format of the CSS defined by the ITU-T Recommendation T.62.

An identifier indicating the CSS is provided at the beginning followed by an identifier indicating the length of a command of the CSS. In the present example, L1 is used. Following to L1, a parameter filed is provided which may includes a non-standard function parameters.

L2 designates an identifier for indicating the length to the end of the non-standard functions or faculties. In the present example, the non-standard parameters are provided at the end portion of the CSS command although they may be provided in an intermediate area. A field following to the manufacturer or maker code is an area which may be freely set by the manufacturer and no restriction to the content thereof is defined.

When it is attempted to provide similar functions of the functions or faculties set for each manufacturer on one terminal device, two or more manufacturer codes must be set and informed to the existing terminals in order to eliminate any affect to the existing terminals.

However, in the communication apparatus such as the facsimile device, it is only defined to send single manufacturer code for the sending timing and frame and the location in the frame in sending the manufacturer code.

SUMMARY OF THE INVENTION

It is an object of the present invention to provide an improved communication apparatus in the light of the problems described above.

It is another object of the present invention to provide a communication apparatus which allows the compatibility for special functions between communication apparatus of different manufacturers.

Other objects of the present invention will be apparent from the following description of the embodiments and the drawings.

BRIEF DESCRIPTION OF THE DRAWINGS

FIG. 8 shows a handlable or available item table used in a first embodiment of the present invention.

FIG. 11 shows a storage area of a manufacturer or maker code in the first embodiment.

FIG. 28 shows a structure of a CSS in the fifth embodiment.

DETAILED DESCRIPTION OF THE PREFERRED EMBODIMENTS

Figure 1:
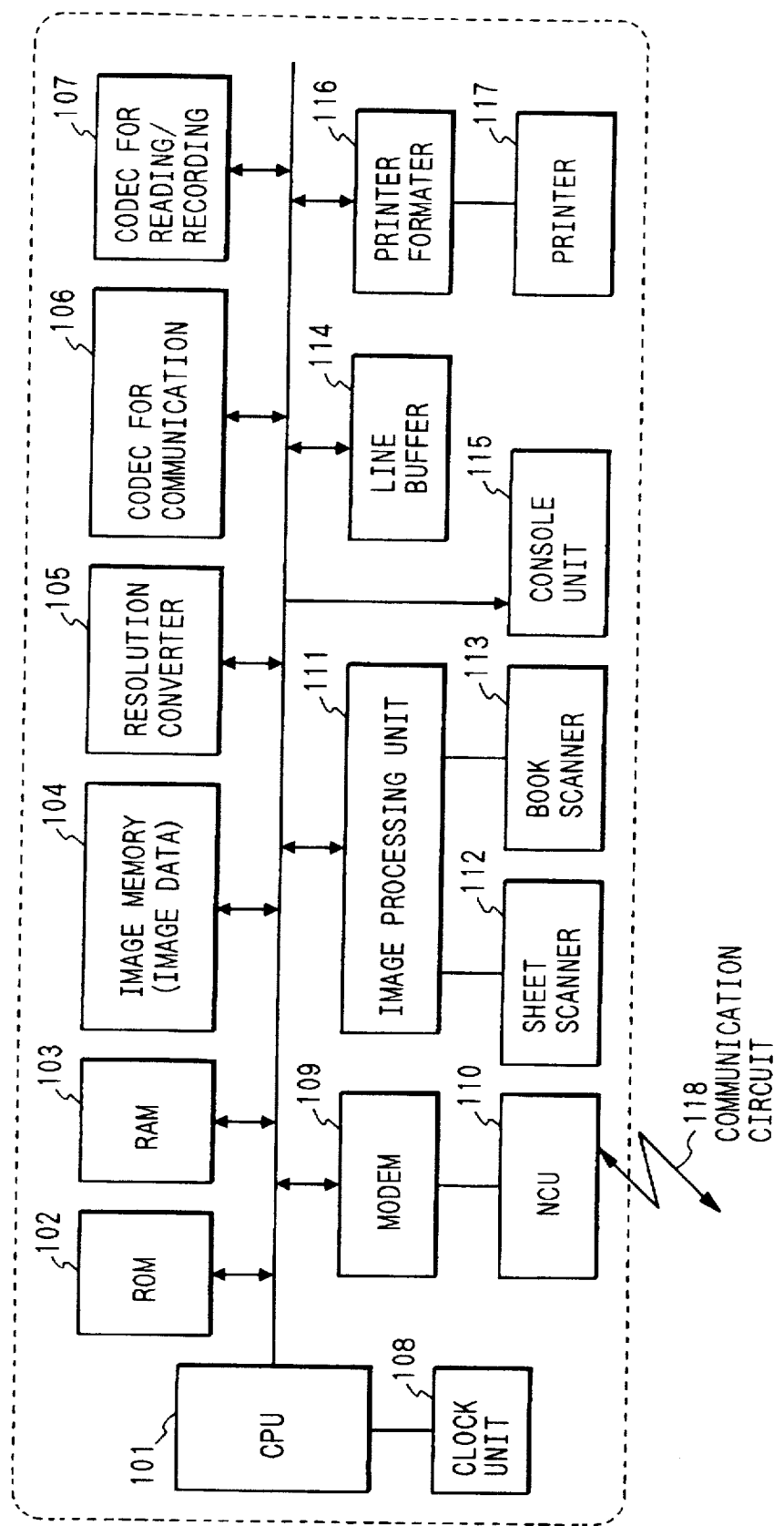
FIG. 1 shows a block diagram of a communication apparatus in accordance with one embodiment of the present invention.

Referring to the drawings, the embodiments of the present invention are explained in detail.

FIG. 1 shows a block diagram of a communication apparatus in accordance with an embodiment of the present invention.

A CPU 101 is a system control unit which controls an entire system, and a ROM 102 stores a control program for the CPU 101.

A RAM 103 may be an SRAM, for example, and stores program control variables. It also stores settings registered by an operator, various working buffers, and control data of the units. An image memory 104 may be a DRAM and stores image data.

A resolution conversion unit 105 controls the resolution conversion such as millimeter-inch resolution conversion of raster data.

A communication coding/decoding unit (communication codec) 106 and a read/record coding/encoding unit (read/record codec) 107 code and decode image data to be handled by the communication apparatus.

A clock 108 may comprise a clock IC and measures an operation interval.

A modem (modulator/demodulator) 109 modulates and demodulates transmitting/received signals of the communication, and an NCU (network control unit) 110 has a function to send a selection signal (dial pulse or tone dialer) to a communication line 118 and conducts an automatic receive operation by detecting a call signal and a line control operation.

A sheet scanner 112 and a book scanner 113 each includes a contact type image sensor and a document sheet feeder and optically reads a document sheet and converts it to electrical image data. The image data is corrected by an image processing unit 111 which outputs fine image data.

A console unit (operation unit) 115 comprises a console panel having a key board and a display unit so that an operator may input data. A line buffer 114 is used to control the transfer of the image data.

A printer 117 is an LBP (laser beam printer) for recording a received image or file data on a plain paper. A printer formatter 116 analyzes a printer description language and converts it to image data when file data from a workstation is to be printed.

Figure 2:
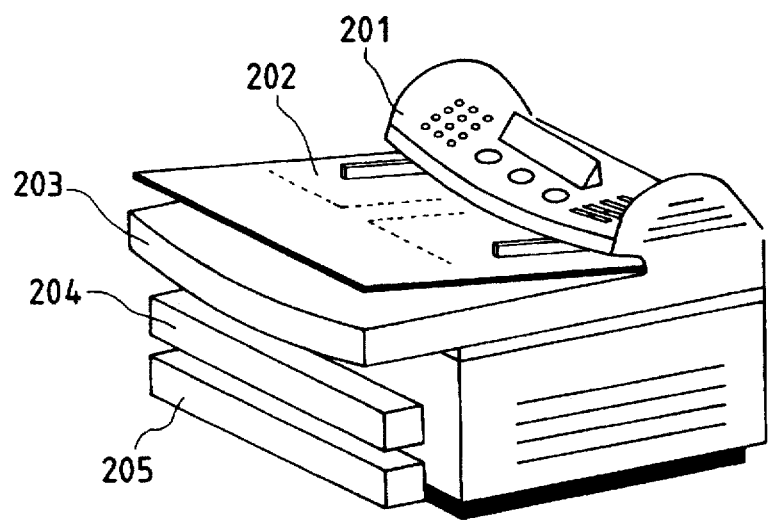
FIG. 2 shows a perspective view of an external view of the communication apparatus of the embodiment.

FIG. 2 shows a perspective view of an external view of the communication apparatus of the embodiment.

A console panel 201 has display unit to allow the confirmation of content specifying an operation. A sheet reader 202 mounts an ADF (automatic sheet feeder) function. A sheet read unit 203 also serves as a cover for retaining a book document sheet. A record sheet ejection unit 204 ejects a printed record sheet. Record sheets are set in a record sheet holder 205.

Figure 3:
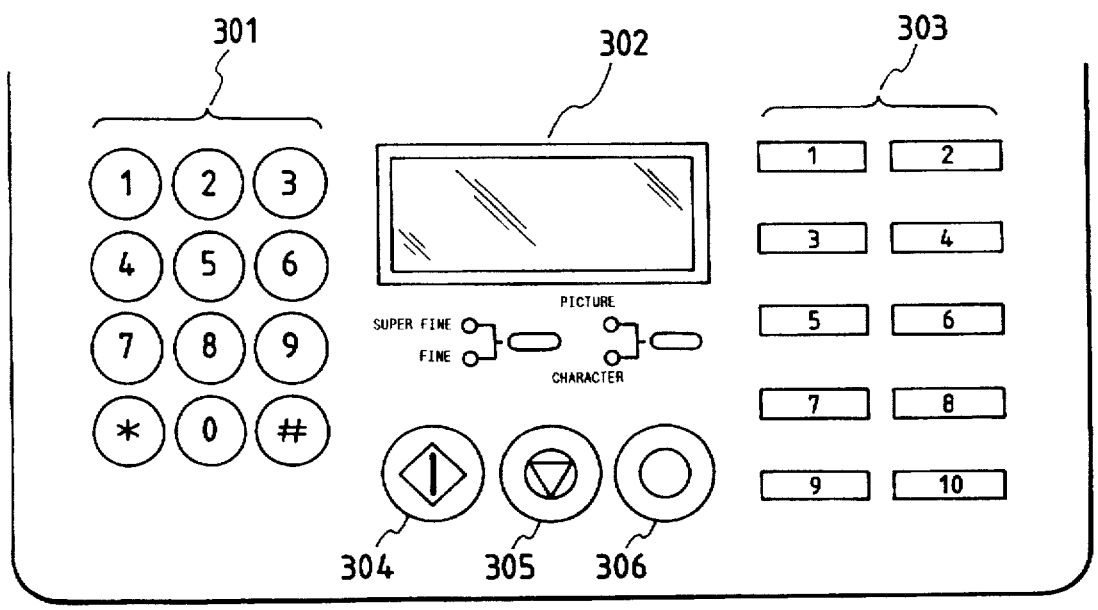
FIG. 3 shows a plan view of a construction of a console panel in the embodiment.

FIG. 3 shows a plan view for illustrating a construction of the console panel 201 in the present embodiment.

The console panel 201 comprises a ten-key 301 for dialing and setting various values, a display unit 302 such as an LCD for confirming the content, one-touch keys 303 to allow selection of a destination station by a one-touch operation, a start key 304 for indicating the start of operation, a stop key 305 for indicating the interruption of operation, and a manufacturer identifier key 306 for registering and selecting a manufacturer identifier.

Those are common construction to the embodiments of the present invention.

A first embodiment of the present invention is now described.

FIG. 8 shows an example of a handlable item table which indicates manufacturer codes which may be handled by the communication apparatus of the first embodiment and functions relating to the manufacturer codes.

The table is stored in the RAM 103. On the table, the manufacturer codes A to X are handlable and personal (confidential), abbreviated name notice, relay and high resolution may be set for each manufacturer code. For example, it is registered that a manufacturer code A may be used and non-standard functions in the manufacturer code including personal (confidential), abbreviated name notice, relay and high resolution may be used. The registration may be made by keying by the manufacturer identifier key 306.

Figure 9:
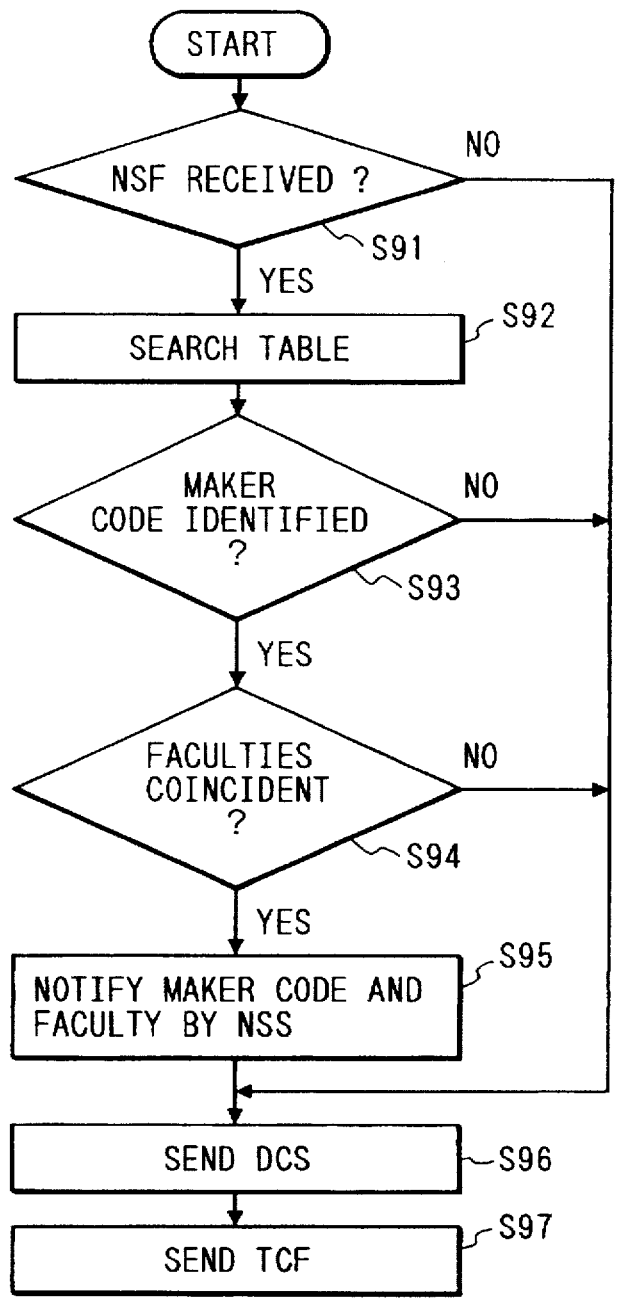
FIG. 9 shows a flow chart of a communication protocol of the G3 facsimile in the first embodiment.

FIG. 9 shows a flow chart of an example of communication protocol of a G3 facsimile in the present embodiment.

Figure 4:
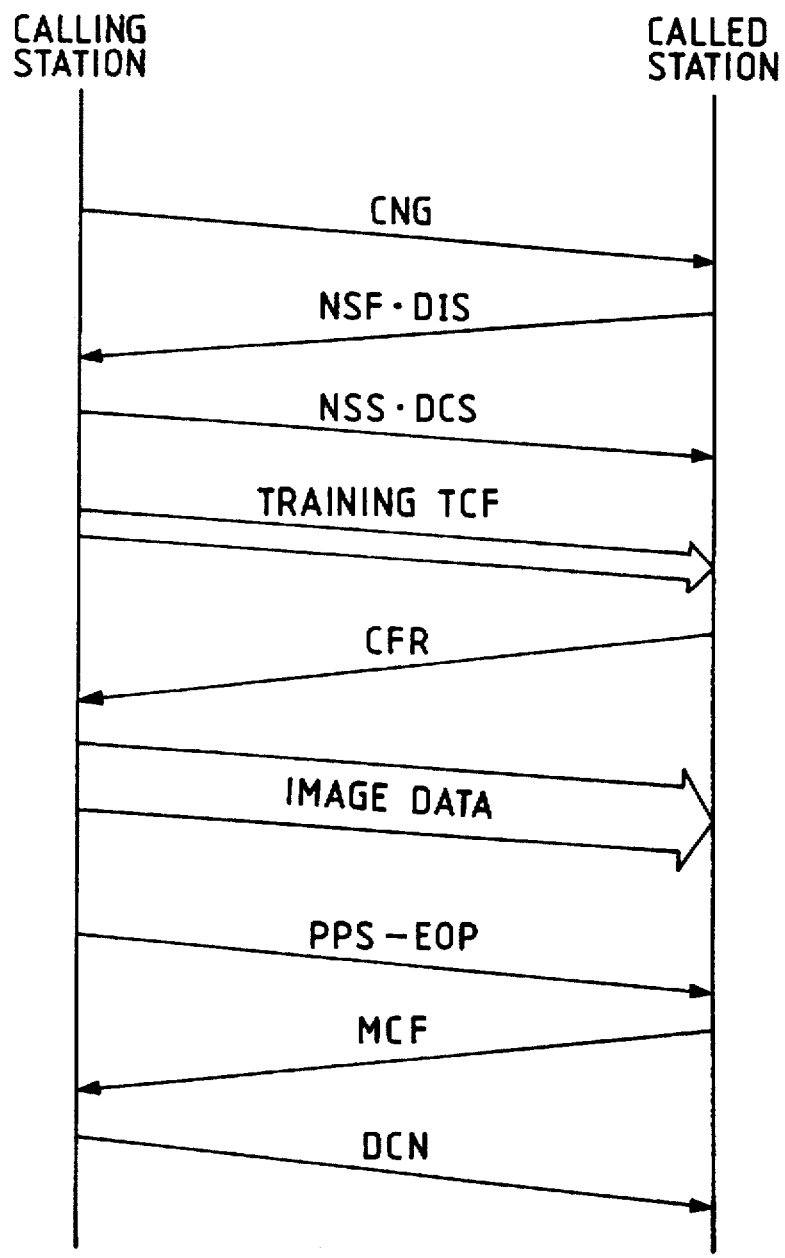
FIG. 4 shows a sequence chart of a normal protocol of a G3 facsimile.
Figure 5:
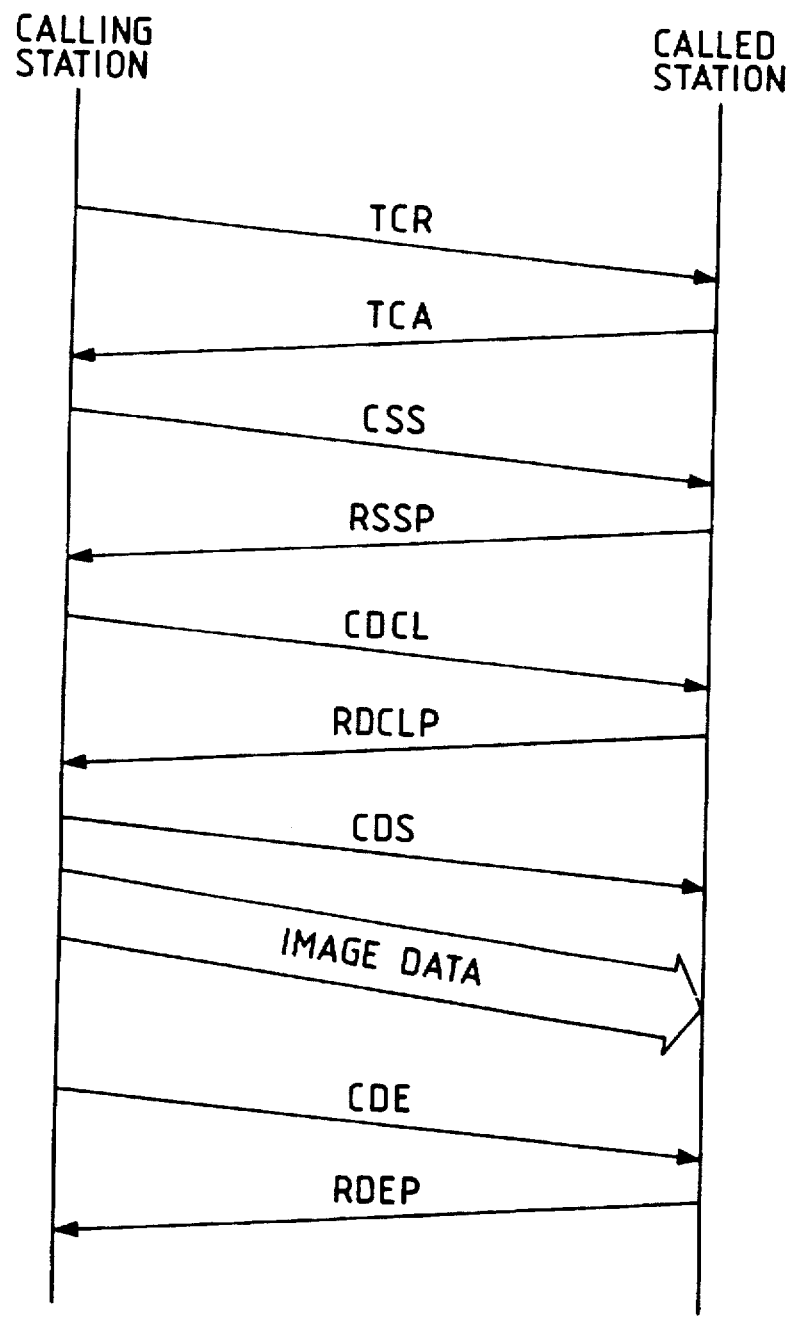
FIG. 5 shows a sequence chart of a normal protocol of a G4 facsimile.

An operation in FIG. 9 shows the control of the calling station which sends CNG in FIG. 4.

S91 denotes a step for waiting the reception of NSF. When NSF is received, the process proceeds to S92. However, if NSF is not received in S91 but only DIS is received, the process proceeds to S96.

In S92, whether the same code as the manufacturer identification number of the called station contained in NSF is contained in the handlable item table shown in FIG. 8 or not is determined. In S93, if the presence of the manufacturer identification number is detected, the process proceeds to S94, and if the absence of the manufacturer identification number of the called station in the table of FIG. 8, the process proceeds to S96.

In S94, whether the function code contained in NSF is contained in the handlable item table or not is determined, and whether a function which the calling station user intends to conduct corresponds thereto or not is determined. If the function is not contained, the process proceeds to S96, and if it is contained, the process proceeds to S95.

In S95, when the manufacturer code of NSF corresponds to the function code, the corresponding manufacturer code and the function which the calling station user intends to conduct are added to NSS and it is sent, and the process proceeds to S96.

In S96, DCS which can declare standard functions from the calling station is sent. In S97, TCF is sent following to DCS.

In FIG. 9, when the manufacturer identification number and function notified by NSF are not registered in the handlable item table, NSS is not sent but DCS is sent. Alternatively, NSS and DCS as well as TSI may be sent in order to explicitly indicate the manufacturer identification number of the calling station to the called station. The present flow chart may also cover a case where NSC is sent for NSF such as in a polling protocol.

Figure 10:
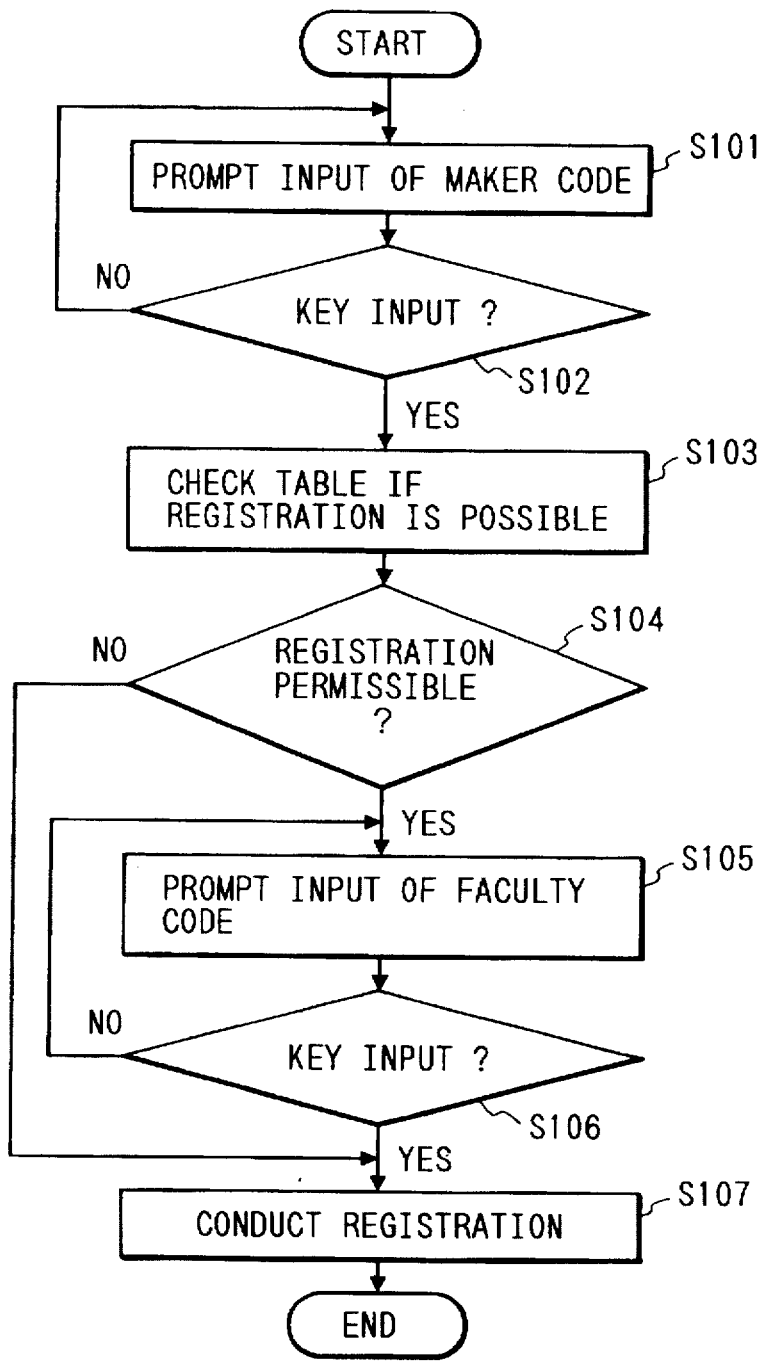
FIG. 10 shows a flow chart of a registration process to the handlable item table in the first embodiment.

FIG. 10 shows a flow chart of an operation when registration is made to the handlable item table shown in FIG. 8.

This operation is started by the selection of the registration of the manufacturer identifier of the user data by a predetermined operation from the console panel by the user of the communication apparatus.Namely, in the present embodiment, it is assumed that the manufacturer identifier and the function code may be registered as the items of user data registration in the communication apparatus.

In S101, display is made to prompt the input of the manufacturer code to be displayed on the display unit 302 and in S102, whether valid key input has been made by the user or not is determined. If the valid key input is detected, the process proceeds to S103, and if the valid key input is not detected, the display in S101 is continued until the input is made.

In S102, when the valid key input is detected, the key input is recognized as the manufacturer code and the process proceeds to S103. In S103, the handlable item table is referred to check whether there is a vacancy in the table or not and whether the previously registered manufacturer code is included or not.

In S104, whether the input manufacturer code is registerable or not is determined by the result of S103. If it is registerable, the process proceeds to S105 to input the function code. If it is not registerable, the registration process is terminated.

In S105, display is made to prompt the input of the function code on the display unit 302 as it is in S101. In S106, the input of valid function code is determined and the display is continued until the valid code is inputted. If the valid function code is inputted, the process proceeds to S107 and the writing to the RAM 103 is conducted. After the writing, the process is terminated.

In the present embodiment, one function code is set for one manufacturer code although a plurality of function codes may be set. In this case, a step to determine whether it is the input of an end of registration code or not is added in S106. The registration in S107 may be the addition of function.

FIG. 11 illustrates a storage area of the communication manufacturer code in the present embodiment.

In the present embodiment, the manufacturer code X is stored. The storage area is present on the RAM 103. The registration to the storage area may be made by the user of the communication apparatus or automatically by the communication apparatus.

Figure 12:
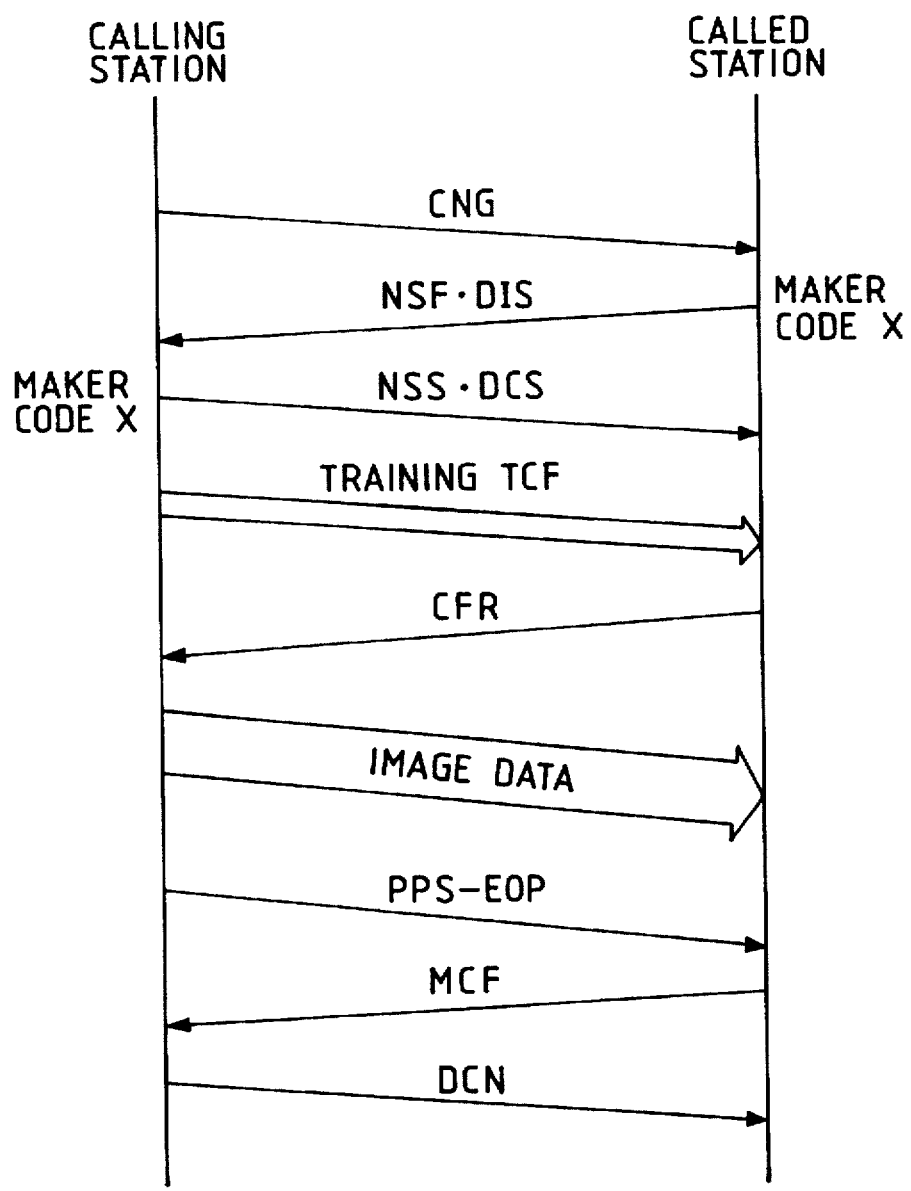
FIG. 12 shows a sequence chart indicating a communication operation in the first embodiment.

FIG. 12 shows a sequence chart of a communication 5 operation when the communication manufacturer code has been registered as shown in FIG. 11.

In FIG. 12, a sequence when the called station is the communication apparatus of the present embodiment is explained. After CNG is received, the manufacturer code X is set in NSF whatever telephone number the calling station is and the functions set in the handlable item table are set and sent.

When the communication apparatus of the present embodiment is in the calling station, if the function designated by the user is registered in the handlable item table together with the manufacturer code X, the function designated by the user and the manufacturer code X are set in NSS without regard to the content of the received NSF and they are sent.

If the function designated by the user is not registered in the handlable item table, it is informed to the user. In the present embodiment, one desired manufacturer code is extracted from a plurality of handlable manufacturer codes and it may be fixedly set on the communication protocol.

Figure 13:
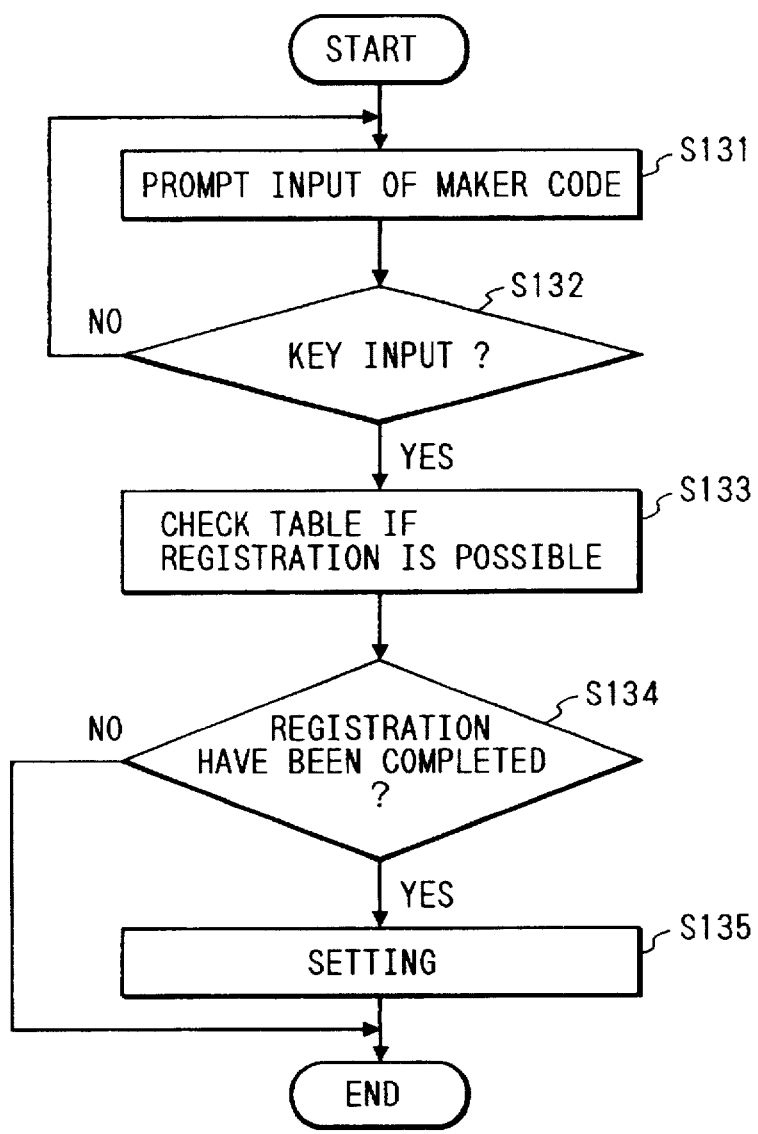
FIG. 13 shows a flow chart for illustrating an error process in registering in a manufacturer or maker code registration area in the first embodiment.

FIG. 13 shows a flow chart for illustrating an error process in registering in the communication manufacturer code registration area.

S131 and S132 correspond to S101 and S102, respectively. In S132, when a valid key input is received from the user, whether the input manufacturer code has been registered in the handlable item table or not is determined in S133.

If the determination step (S134) determines that it has been registered, the code inputted by the user is registered in the communication manufacturer code registration area shown in FIG. 11 (S135). This process prevents the registration of the manufacturer code not registered in the handlable item area to the communication manufacturer code.

In a second embodiment of the present invention, the manufacturer code is registered as an element of address information registered in the one-touch dial and it is used in the calling by the one-touch dialing or in the reception of a predetermined mode.

Figure 14:
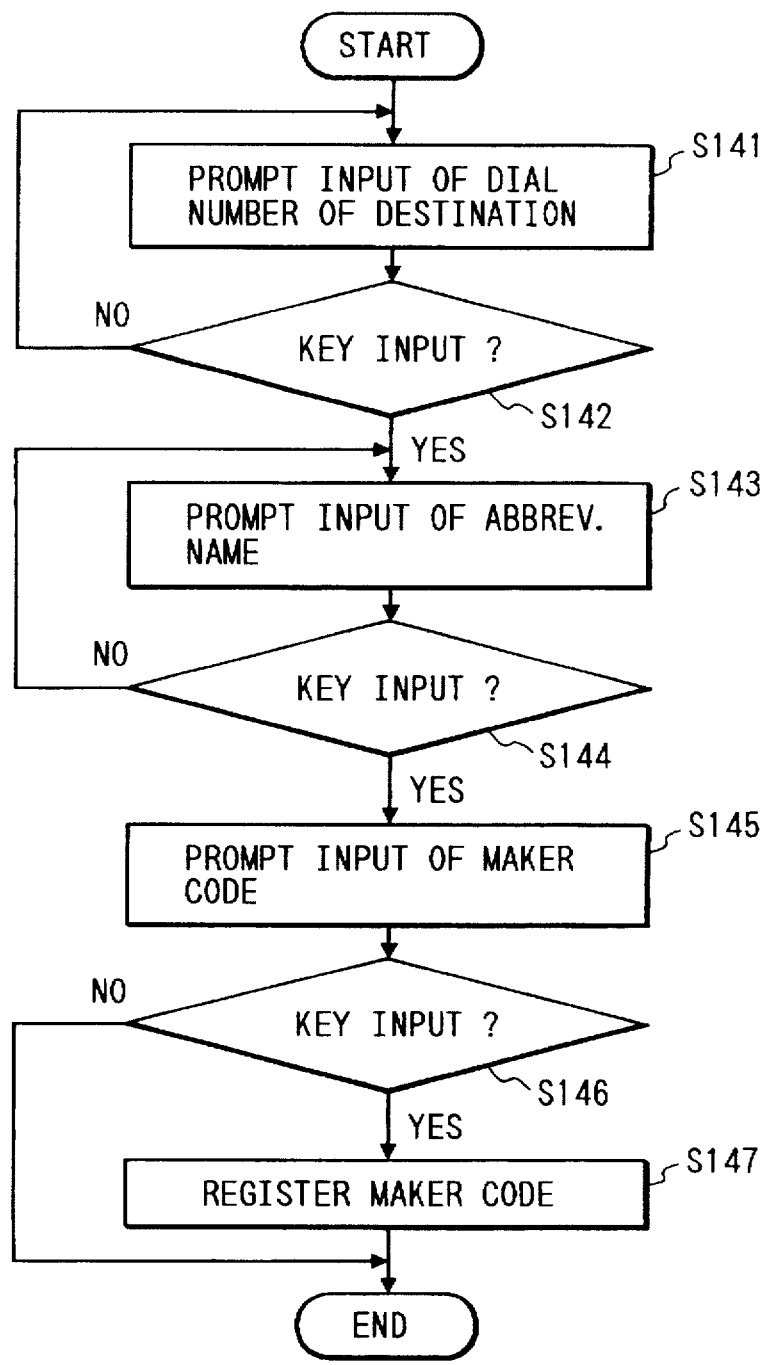
FIG. 14 shows a flow chart of a registration operation to a one-touch key in a second embodiment of the present invention.

FIG. 14 shows a flow chart of a registration operation to the one-touch key 303. The display of the operation is conducted on the display unit 302 and the key entry by the user is conducted by the ten-key 301. The registered data is stored in the RAM 103.

In S141, display is made to prompt the registration of a destination dial number by the registration operation for the one-touch dialing. In S142, the display is continued until the valid input is received.

When the destination dial number is inputted, display is made in S143 to prompt the registration of an abbreviated name of the destination to be used for continued display during the communication with the destination station. In S144, the display is repeated until the valid abbreviation name is inputted.

When the abbreviation name is inputted, display is made to prompt the registration of the manufacturer code which the present communication apparatus is to declare in the communication with the destination station. In S146, when the valid manufacturer code input is detected, the process proceeds to S147 to register the manufacturer code in the one-touch storage area.

When the manufacturer code input is not detected in S146, the manufacturer code is not registered in the one-touch area and the one-touch registration operation is terminated. Namely, for the one-touch dial for which the manufacturer code has not been registered, a conventional operation is conducted.

Figure 15:
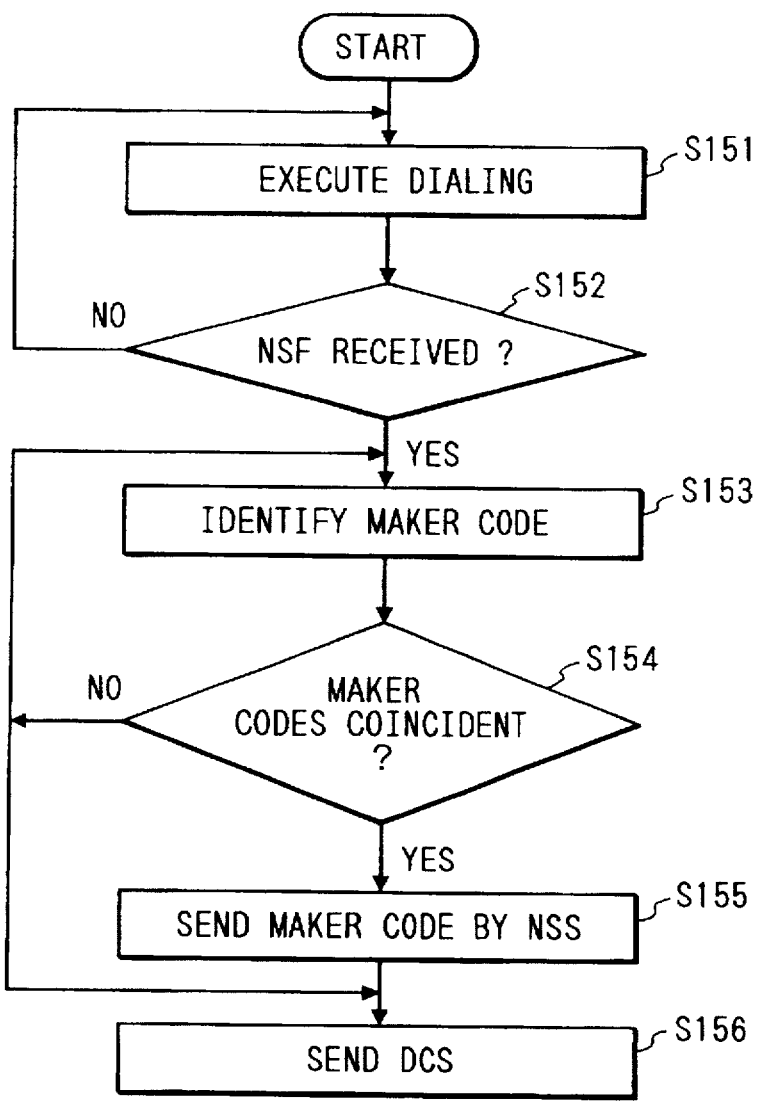
FIG. 15 shows a flow chart of a communication operation in calling by one-touch dialing in the second embodiment.

FIG. 15 shows a flow chart of a communication operation when the calling operation is conducted by the one-touch dial thus registered.

After a document sheet is set in the reader 202, the one-touch key 303 is depressed to start the dialing in S151. When the call to the called station is established, signals such as NSF is received from the called station.

In S152, whether NSF is included in the signal from the called station or not is determined. In NSF is not received, the process proceeds to S156 to send DCS. When NFS is received, the process proceeds to S153 to compare the manufacturer code contained in NSF with the mm code contained in the storage area of the one-touch dial used for calling.

In the comparison (S154), if the matching does not occur, the process proceeds to S156, and if matching occurs, NSS containing the manufacturer code is sent in S155. Then, DCS is sent in S156.

Figure 16:
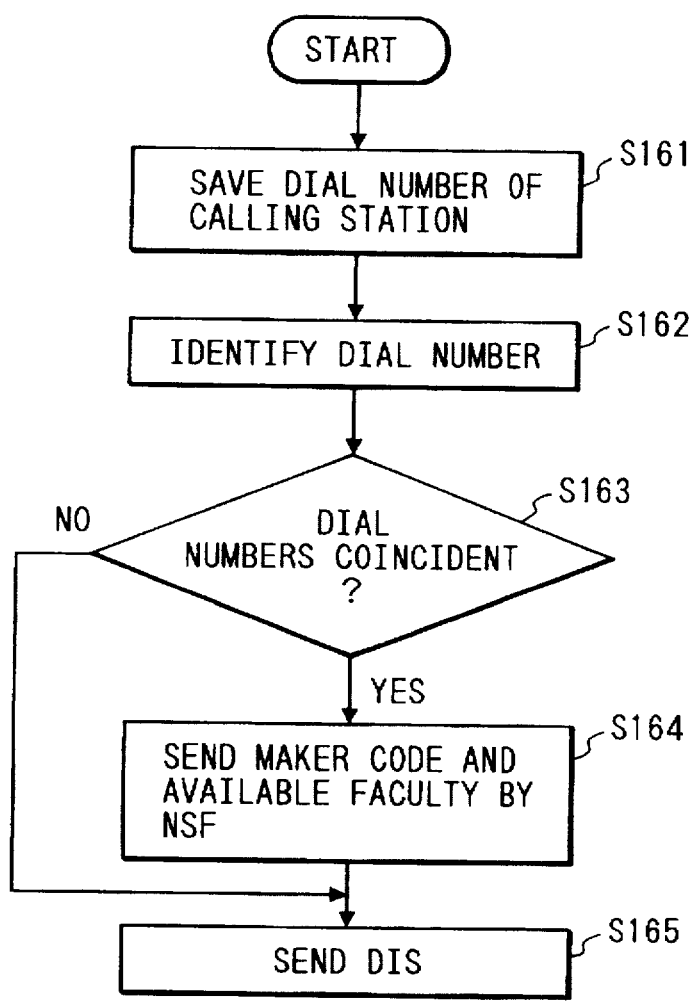
FIG. 16 shows a flow chart of a receiving operation when the manufacturer or maker code is included in the one-touch dialing in the second embodiment.

FIG. 16 shows a flow chart of a receive operation when the manufacturer code is contained in the one-touch dial. This is particularly effective when the telephone number of the calling station is informed from the line in ISDN or other network.

In S161, the dial of the calling station received from the line is held on the memory (RAM 103). In S162, the dial in the one-touch storage area is compared with the dial received from the line. If there are a plurality of registered one-touch dials, the comparison is repeated until the matching occurs.

In S162, if the destination dial does not match, the process proceeds to S165 to send DIS. If it matches, the process proceeds to S164 and the manufacturer code contained in the matched one-touch storage area and the function corresponding to the manufacturer code managed on the handlable item table of FIG. 8 are added to NSF and sent to the destination station. Then, DIS is sent in S165.

The above function is provided not only in the one-touch dial but it may be provided in dial which is a combination of a set of keys (abbreviated dial). The item registerable in the one-touch dial includes not only the manufacturer code but a combination of functions which may be inputted.

Figures 17, 18:
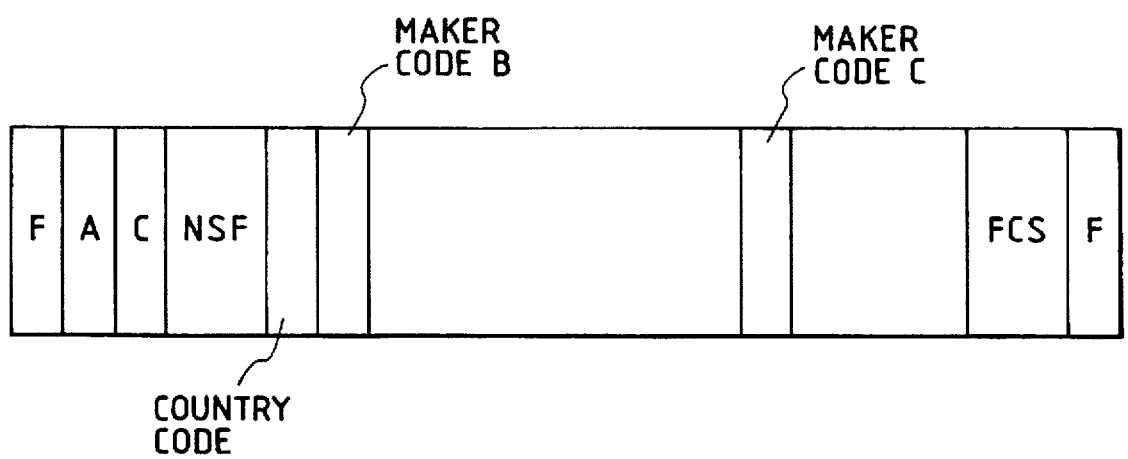
FIG. 17 shows main/sub-manufacturer tables used in a third embodiment of the present invention.
FIG. 18 shows a structure of an NSF frame in the third embodiment.

In a third embodiment of the present invention, two manufacturer codes are set. FIG. 17 shows a main/sub-manufacturer tables used in the third embodiment. The table is stored in the RAM 103.

Figure 6:
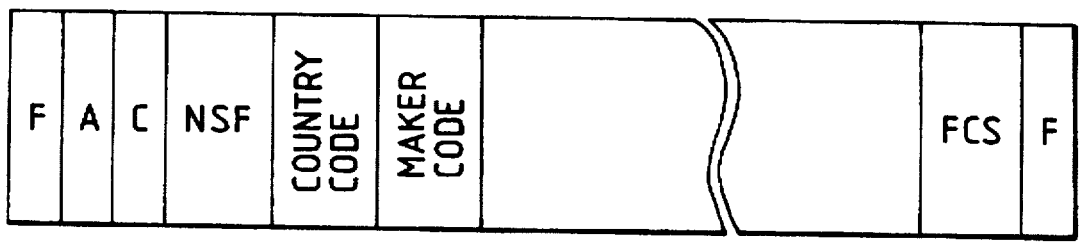
FIG. 6 shows a structure of an NSF frame used in the protocol of FIG. 4.
Figure 7:
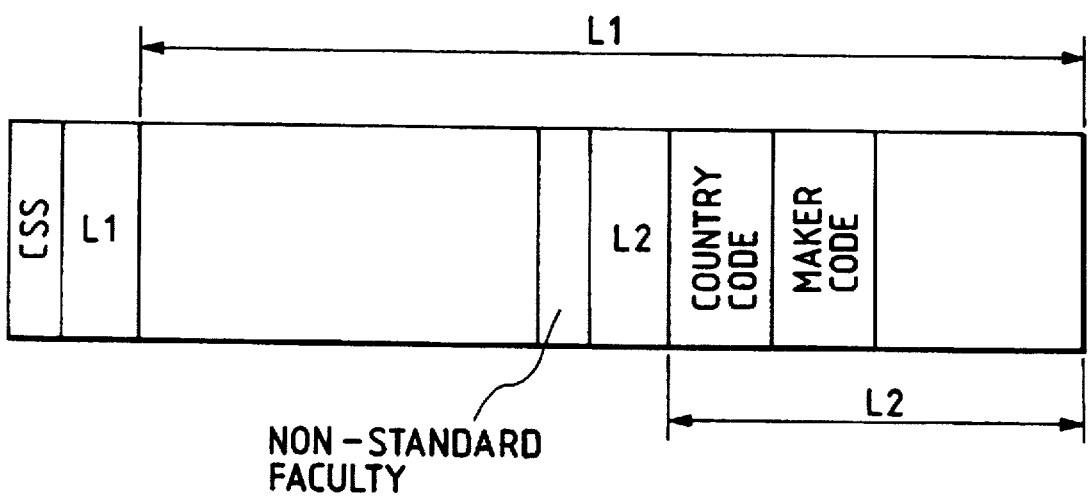
FIG. 7 shows a structure of CSS used in the protocol of FIG. 5.

In the example of FIG. 17, a manufacturer code B is inputted as the main manufacturer code and a manufacturer code C is inputted as the sub-manufacturer code. In the present embodiment, the manufacturer code which is normally sent as shown in FIG. 6 is sent by including the two manufacturer codes included in the table into the NSF frame as shown in FIG. 18.

In this case, a function length of the manufacturer code B which is different from non-standard parameters may be provided following to the manufacturer code B in FIG. 18, or a parameter code used in NSF may be of different code scheme from the manufacturer code to discriminate the manufacturer code C.

Figure 19:
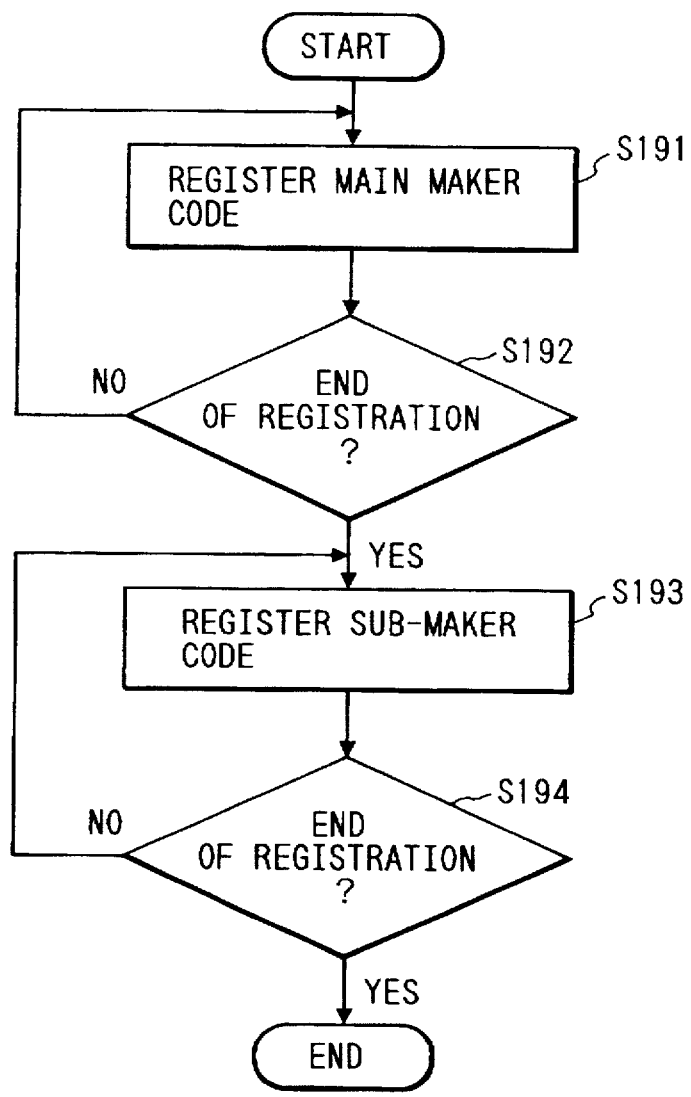
FIG. 19 shows a flow chart of a registration operation to the main/sub-manufacturer tables in the third embodiment.

FIG. 19 shows a flow chart of a registration operation to the main/sub-manufacturer tables.

The registration is conducted as one item such as usual user data. The main manufacturer code is first registered (S191), and when the valid data is inputted and the main registration is completed (S192), the sub-manufacturer code is registered (S193, S194).

In a fourth embodiment of the present invention, a function to rearrange the handlable manufacturer codes on the protocol for transmission is provided.

Figure 20:
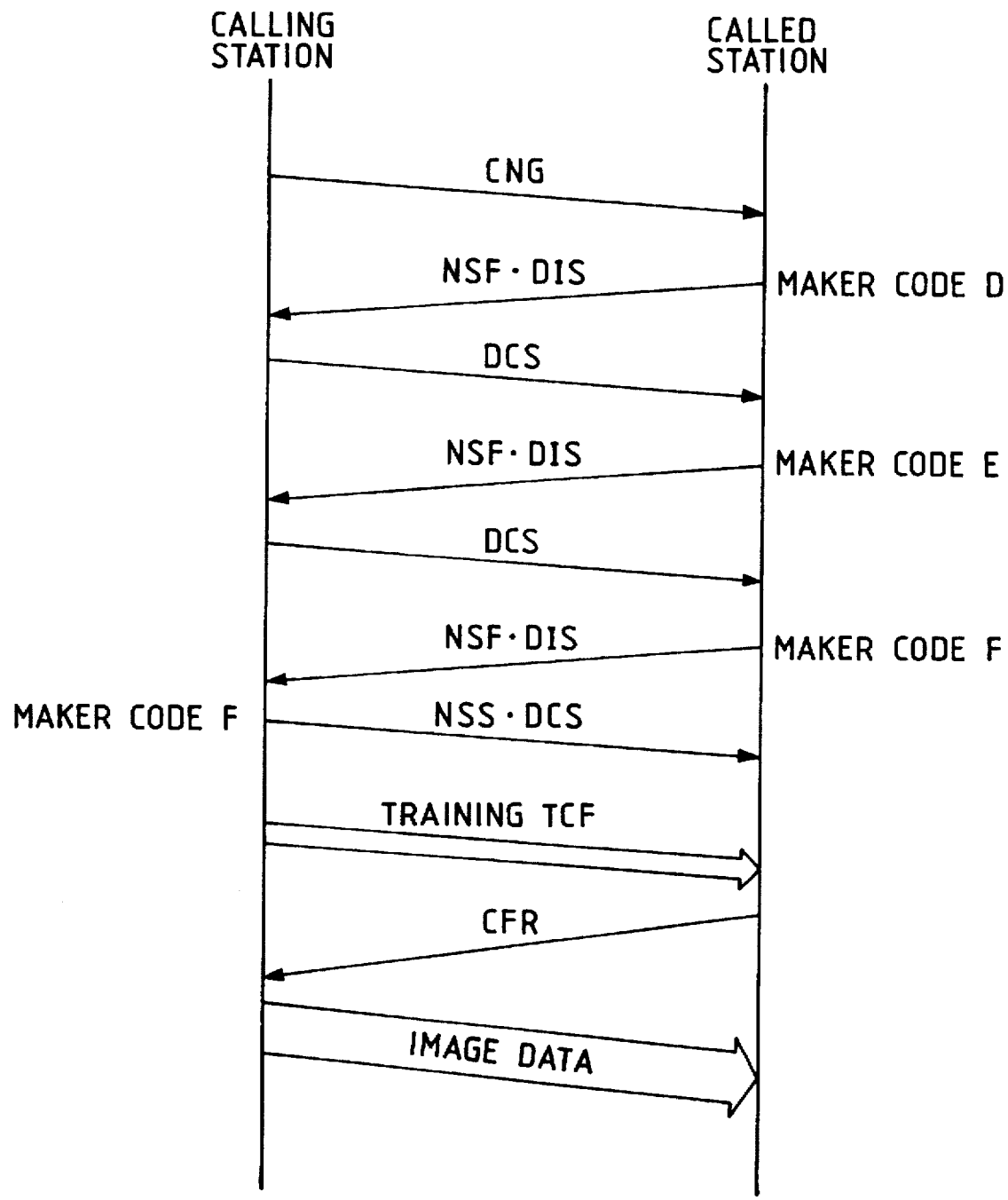
FIG. 20 shows a sequence chart of a communication protocol when a function of a fourth embodiment of the present invention is applied to a called station.

FIG. 20 shows a sequence chart of a communication protocol when the present function is applied to the called station.

As shown, in the present embodiment, the handlable manufacturer codes are alternately sent to the destination on the protocol.

When the called station which adopts the function of the present embodiment receives a signal such as CNG, it first sets the manufacturer code D in NSF and sends it to the calling station together with DIS. When NSS is not received or NSS includes the manufacturer code other than the manufacturer code D, the called station switches the manufacturer code to be added to NSF and sends NSF having the manufacturer code E set therein.

The above operation is repeated by a predetermined number of times or until the same code as the manufacturer code set in NSF is received from the calling station. In the example of FIG. 20, since the manufacturer code F sent at the third transmission matches to the manufacturer code of NSS from the calling station, the reception of TCF is monitored after the reception of NSS and DCS.

Figure 21:
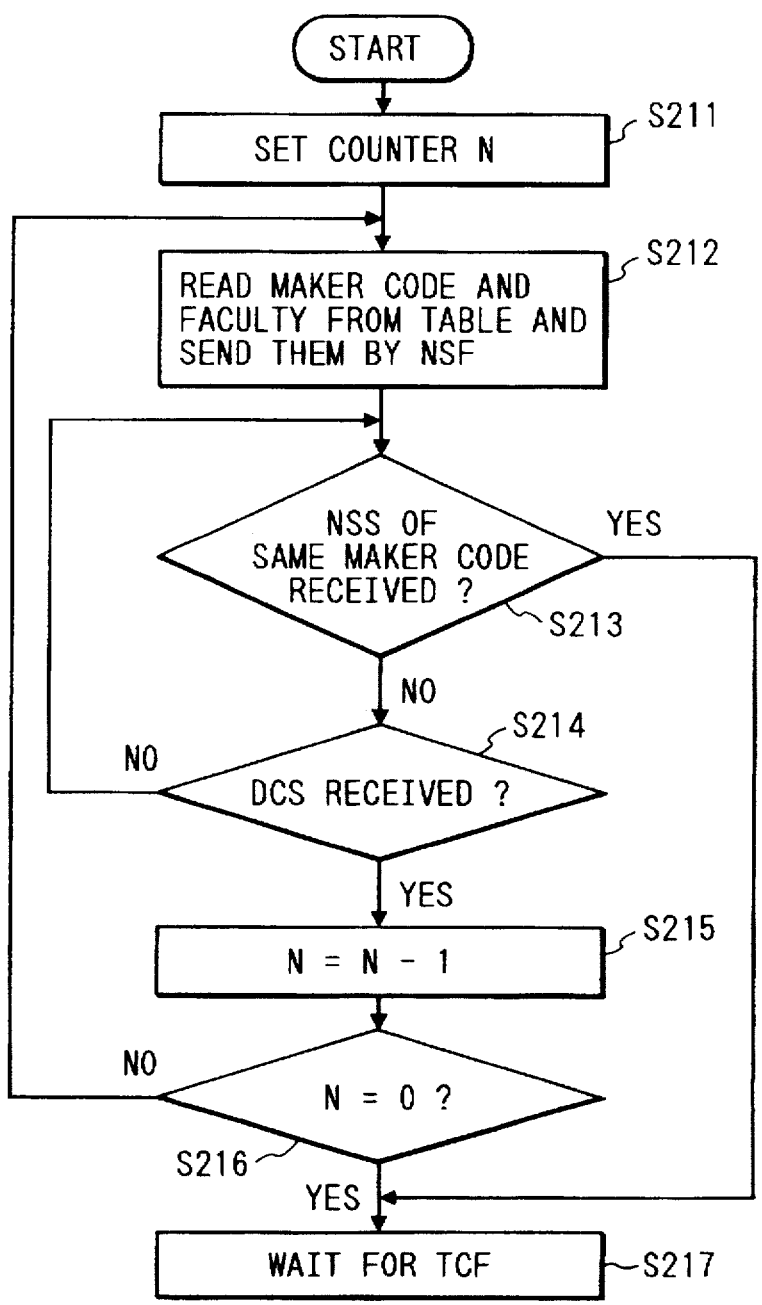
FIG. 21 shows a flow chart of a control operation in the called station corresponding to FIG. 20 in the fourth embodiment.

FIG. 21 shows a flow chart of a control operation of the called station corresponding to FIG. 20. The operation is started when the call is received. In S211, a count N which is the maximum number of times to send NSF is set. The count may be present in the system or externally set by the user. The number of manufacturer codes set in the handlable item table shown in FIG. 8 may be used as N.

In S212, a first manufacturer code is extracted from the handlable item table and the manufacturer code and the handlable functions are set in NSF, and it is sent to the destination station and other fields up to DIS are also sent.

In S213, whether the manufacturer code designated by NSF has been received in NSS or not is determined. If it has been received, the process proceeds to S217 to monitor the reception of TCF. If NSS is not received in S213 or the manufacturer code of NSS is different one, the process proceeds to S214 to monitor the reception of DCS. If DCS is not received, the process loops through S213 and S214.

In S215, the count N is decremented after the reception of DCS, and in S216, whether the count N is zero or not, that is, whether the number of times to send NSF has exceeded the maximum number or not is determined. If it has exceeded, the reception of TCF is monitored in S217.

In the present embodiment, the handlable manufacturer codes are rearranged on the protocol for transmission so that the reception of the communication desired by the calling station is facilitated.

Figure 22:
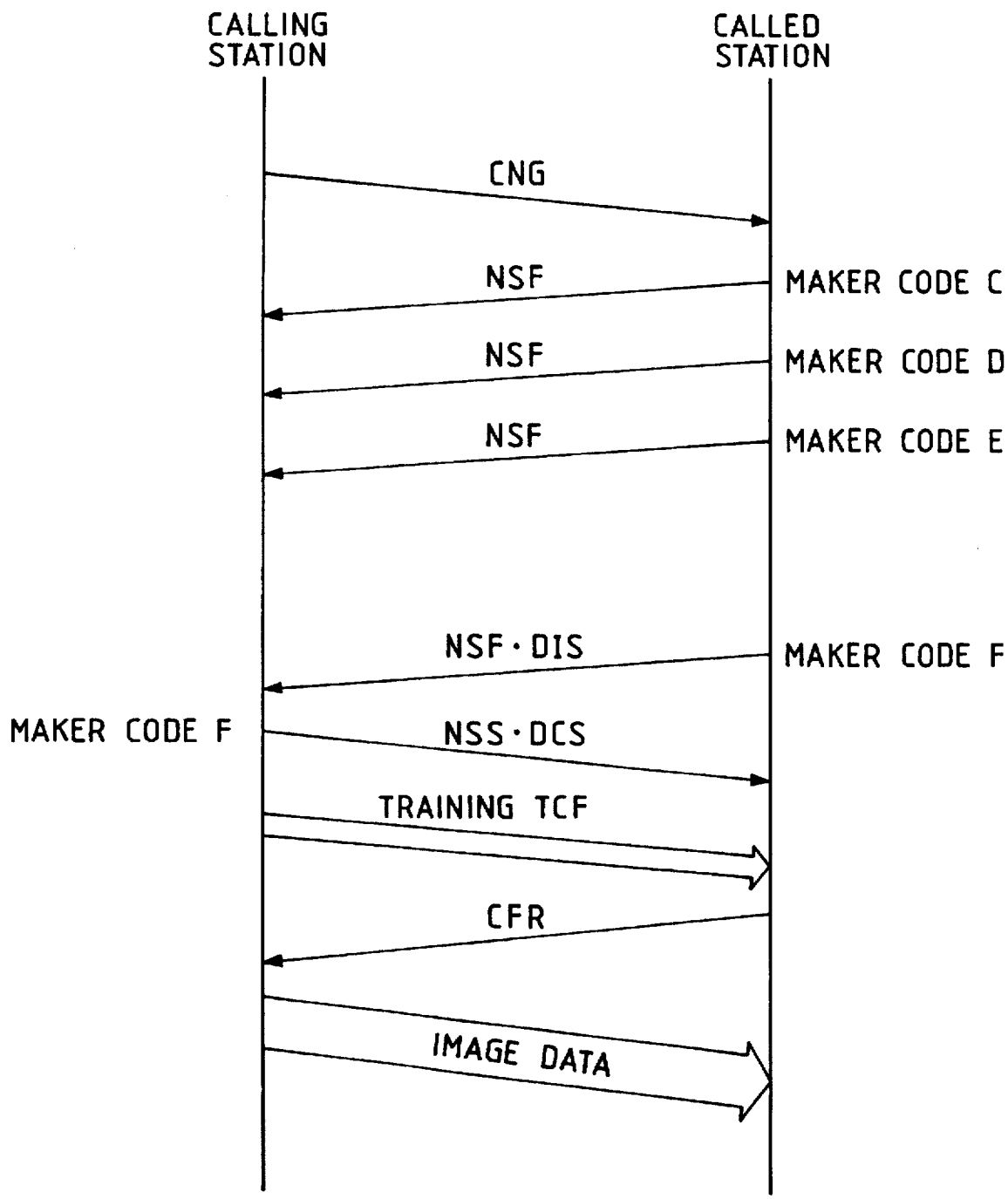
FIG. 22 shows a sequence chart of a communication protocol when the function of the fourth embodiment is applied to both the calling station and the called station.

FIG. 22 shows a sequence chart of a communication protocol when the present function is applied to both the calling station and the called station.

The operation sends the handlable manufacturer codes to the destination station as a multi-frame on the protocol. In the calling station, if the manufacturer code which is handlable by the terminal of its own is included in the receive NSF and the communication function designated by the user of the calling station is included in NSF, it sets the manufacturer code in NSS and informs it to the called station.

In FIG. 22, when the called station which employs the present function receives a signal such as CNG, it first sets the manufacturer code C in NSF and sets the handlable functions of the manufacturer code C and sends them to the calling station as a first frame.

Then, manufacturer codes D, E and F to be transmitted are set in NSF together with the functions of the manufacturer codes as separate frames and they are sent to the calling station. When the manufacturer code to be sent is no longer present, DIS is sent to declare the end to the calling station.

Figure 23:
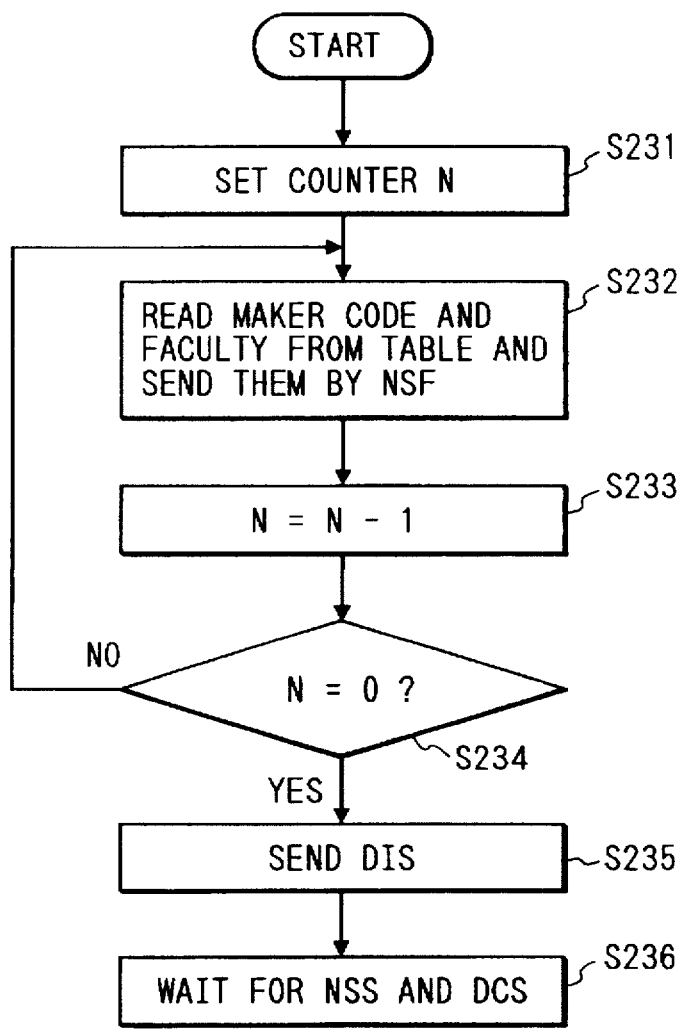
FIG. 23 shows a flow chart of a control operation in the called station corresponding to FIG. 22 in the fourth embodiment.

FIG. 23 shows a flow chart of a control operation of the called station corresponding to FIG. 22.

The operation is started when the call is received. In S231, a count N which the maximum number of times to send NSF is set. The count may be preset in the system or externally set by the user. The number of manufacturer codes set in the handlable item table shown in FIG. 8 may be used as N.

In S232, a first manufacturer code is extracted from the handlable item table and the manufacturer code and the handlable functions are set in NSF and it is sent to the calling station. In S233, after the transmission of NSF, the count N is decremented and in S234, whether the count N is zero or not, that is, whether the maximum number of times to send NSF has exceeded N or not is determined. If it has exceeded, DIS is sent in S235. The process proceeds to S236 to monitor the reception of NSS and DCS.

In the present embodiment, the handlable manufacturer codes are sent as separate frames on the protocol to facilitate the reception of the communication desired by the calling station.

A fifth embodiment of the present invention is explained.

In FIG. 28, a plurality of handlable manufacturer codes are set in CSS in a protocol of a G4 facsimile. The number of manufacturer codes set in CSS may be preset in the system or externally set by the user. They may be set as many as the number of manufacturer codes set in the handlable item table shown in FIG. 8.

The manufacturer codes may be set in one or all of RSSP, CDCL and RDCLP instead of CSS.

A sixth embodiment of the present invention is explained.

Figure 24:
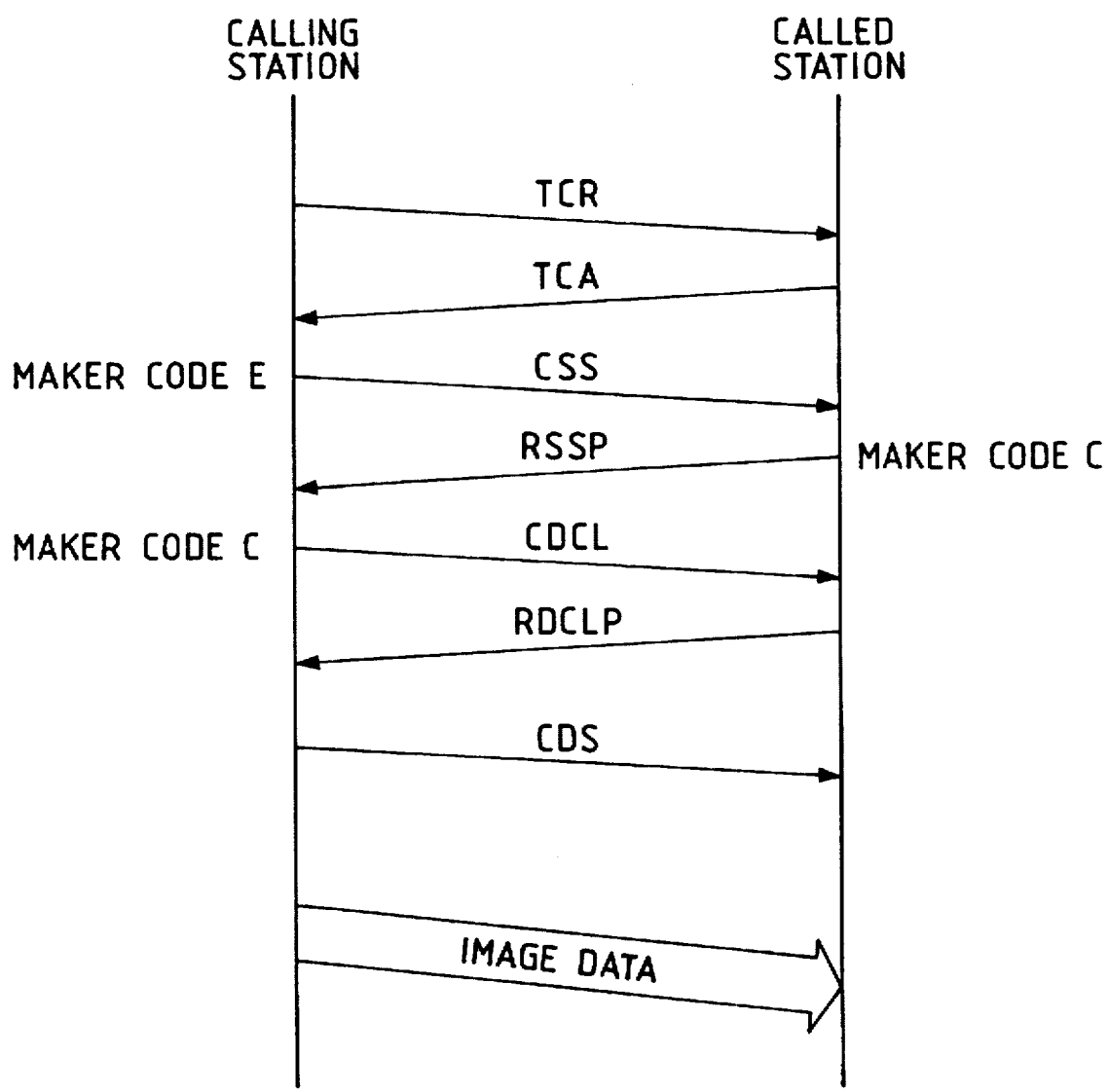
FIG. 24 shows a sequence chart of a communication operation when a function of a sixth embodiment is applied to the calling station.

FIG. 24 shows a sequence chart of a communication operation which uses the function of the present embodiment in the calling station.

In the present embodiment, when the manufacturer code contained in the RSSP frame received in the calling station is handlable, the manufacturer code is set in the CDCL frame for communication. The manufacturer code E is set in CSS from the calling station. The transmission of the manufacturer code E may be preset or a manufacturer code at the top of the handlable item table.

When RSSP which is a response to CSS is received, the manufacturer code included in RSSP is referred. In the present embodiment, since the manufacturer code C is set, whether the manufacturer code C is handlable or not is determined. Since it is handlable in the present example, the manufacturer code C is set in CDCL and it is sent to the called station.

The manufacturer code C as well as the function for the manufacturer code C are included in CDCL. After the reception of CSS of the manufacturer code E, the called station determined whether the manufacturer code E is handlable or not, and if it is handlable, the manufacturer code E and the functions for the manufacturer code E are added to RSSP.

In the ITU-T T.62 Recommendation, the negotiation of CDCL/RDCLP is permitted a plurality of times. Thus, when the manufacturer code in the received RDCLP is different from the manufacturer code sent by CDCL and the manufacturer code of RDCLP is handlable, the manufacturer code is set in CDCL for transmission. This is also covered by the present invention.

Figure 25:
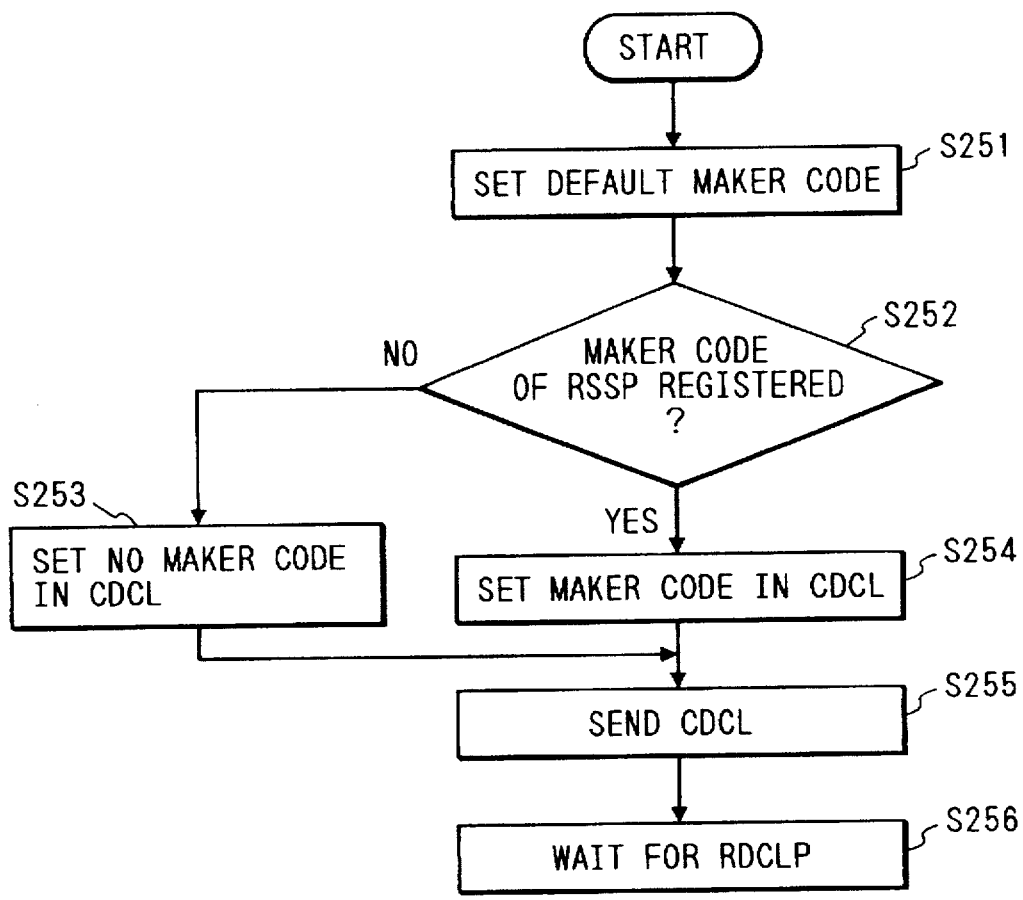
FIG. 25 shows a flow chart of a control operation in the calling station in the sixth embodiment.

FIG. 25 shows a flow chart of a control operation in the calling station in the present embodiment. The flow chart shows an operation after the completion of the transmission and reception of TCR/TCA.

In S251, the pre-registered manufacturer code is set in CSS. In S252, RSSP is received and whether the manufacturer code included in RSSP is handlable or not is determined. Specifically, whether the manufacturer declared by RSSP is registered in the handlable item table or not is determined.

If the manufacturer code is not registered, the process proceeds to S253 and CDCL is sent without the manufacturer code being set in CDCL. If it is registered the process proceeds to S254 to set the same manufacturer code as that of RSSP in CDCL and it is sent. Then, the process proceeds to S256 to monitor the reception of RDCLP.

A seventh embodiment of the present invention is explained.

Figure 26:
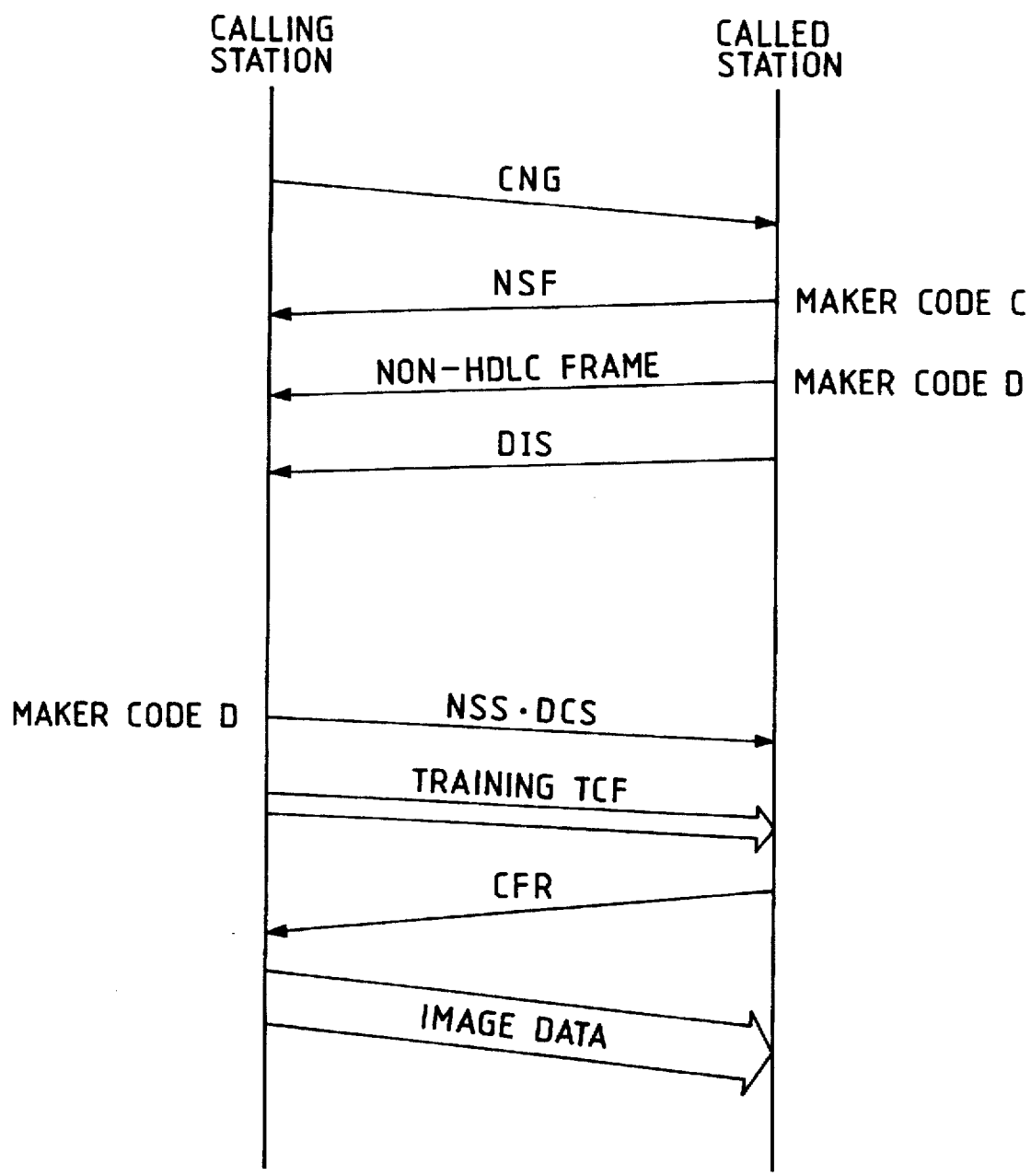
FIG. 26 shows a sequence chart of a communication operation when a function of a seventh embodiment of the present invention is applied to both the calling station and the called station.

FIG. 26 shows a sequence chart of a communication operation when the function of the present embodiment is applied to both the calling station and the called station. In the present embodiment, one handlable manufacturer code is sent by NSF and the manufacturer codes are informed to the calling station by a frame having no HDLC structure.

In the calling station, if the manufacturer code handlable by its own terminal is included in NSF or non-HDLC frames and the communication function designated by the calling station user is included in NSF or non-HDLC frame, it sets the manufacturer code in NSS and informs it to the called station.

In the example of FIG. 26, the manufacturer code C is first set in NSF and then the manufacturer code D is sent to the non-HDLC frame and DIS is sent. In the calling station, since it wants to use the functions registered in combination with the manufacturer code D received in the non-HDLC frame, it sets the manufacturer code D in NSS and sends it to the called station.

The order of transmission of the non-HDLC frame is not limited to the next to NSF. The number of times of transmission is not limited to one. Since the existing terminal which receives the non-HLDC frame is designed to discard the frame as the reception of noise, no problem arises when the order of transmission or the number of times of transmission is changed.

Figure 27:
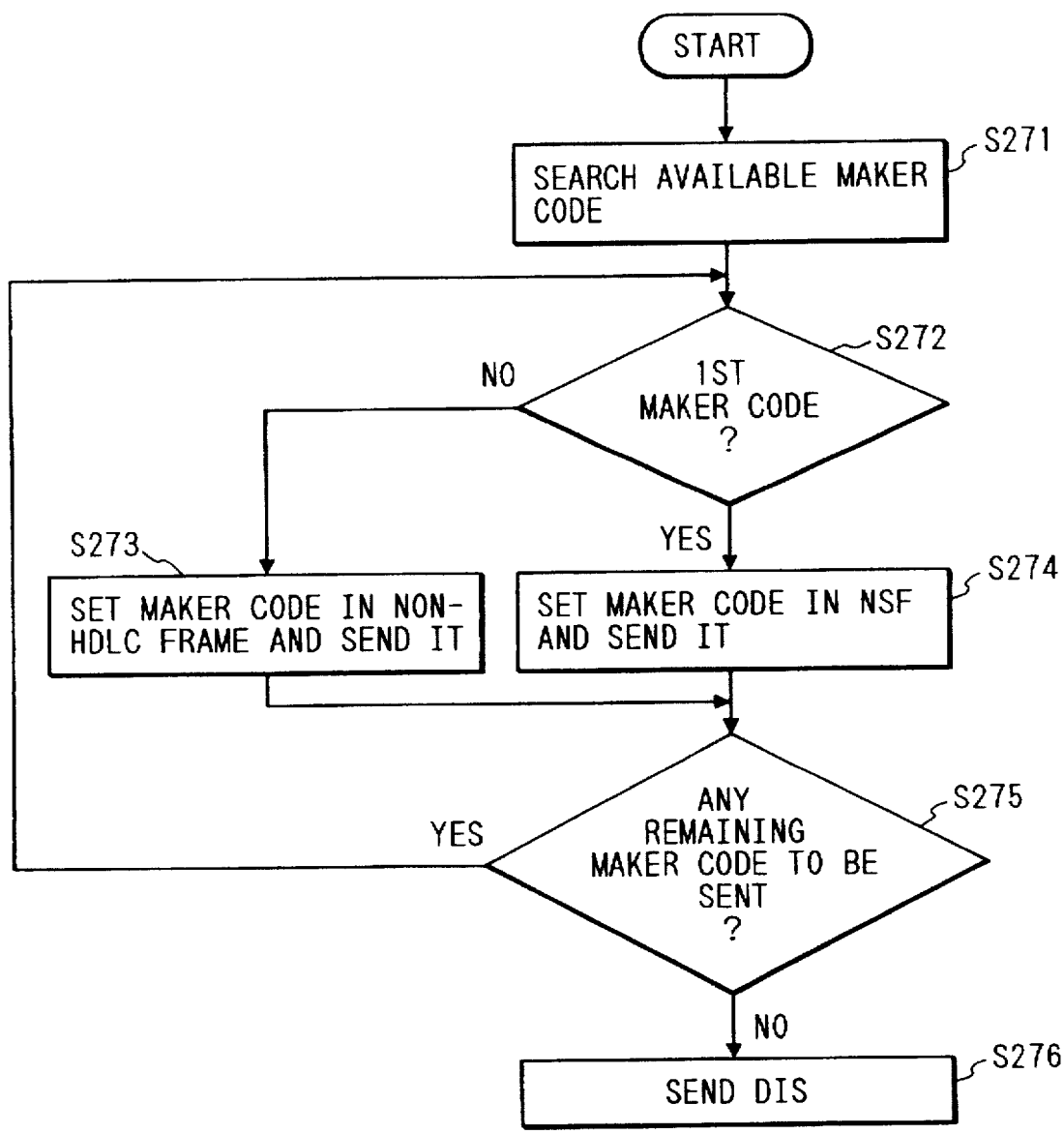
FIG. 27 shows a flow chart of a control operation of the called station in the seventh embodiment.

FIG. 27 shows a flow chart of a control operation of the called station in the present embodiment.

In S271, the handlable manufacturer code is searched, and in S272 whether the frame to be sent is the first manufacturer code or not is determined. If it is the first one, the process proceeds to S274 and it is set in NSF together with the corresponding functions and sent to the calling station. If it is not the first one, the process proceeds to S273 and the manufacturer code and the corresponding functions are set in the non-HDLC frame and sent to the calling terminal.

In S275, whether there remains a manufacturer code to be sent or not is determined, and if all manufacturer codes to be sent have been sent, the process proceeds to S276 to send DIS. The non-HDLC frame is a frame which does not generate a flag sequence of 7EHex in the HDLC. For example, in that frame, when "1" continues five times, "0" is inserted.

In the above embodiments, the manufacturer code is directly inputted as the manufacturer identifier but the present invention is not limited thereto and a code which is indirectly related to the manufacturer may be inputted instead.

Further, in the above protocol, NSF is sent after the CNG signal is received although CED may be sent before NSF.

In accordance with the embodiments of the present invention, even in a case where the manufacturers having unique functions jointly develop a device, the device may provide a communication function which is compatible to other devices of either manufacturer. In a case where the first manufacturer provides a product to the second manufacturer who adds a function thereto and markets it, a communication function which is compatible with other devices of the first and second manufacturers can be provided.

In accordance with the first embodiment, the function may be provided for each manufacturer and the products which have heretofore been closed in one manufacturer are communicatable in the functions of other manufacturer and high grade service may be provided.

In accordance with the first embodiment, communication may be made with more closed networks by providing more manufacturer identifiers and the corresponding functions and high grade service may be provided.

In accordance with the first embodiment, since the user may select a plurality of manufacturer identifiers, the usability and serviceability are enhanced.

In accordance with the second embodiment, since the wasteful operation and erroneous operation can be reduced by presetting the manufacturer identifiers, the usability and serviceability are enhanced.

In accordance with the third embodiment, a new manufacturer identifier may be added without changing the existing signal format.

In accordance with the fourth embodiment, since a number of manufacturer identifiers may be set by informing a plurality of manufacturer identifiers to the calling station by frames, the serviceability is enhanced.

In accordance with the fifth embodiment, since the communication time can be reduced by informing a plurality of manufacturer identifiers to the calling station by one frame, the search capability in the calling station is improved and the serviceability is enhanced.

In accordance with the sixth embodiment, since different manufacturer identifiers are informed in the existing signal format and protocol control, the upper compatible service which does not affect to the existing products is provided.

In accordance with the seventh embodiment, since the manufacturer identifier to be added is informed by the non-HDLC configuration, the upper compatible service which does not affect to the existing products is provided.

It should be understood that the present invention is not limited to the above embodiments but various modifications thereof may be made.

What is claimed is:

1. A communication apparatus comprising:

registration means for registering a plurality of manufacturer identification information for respectively identifying a plurality of manufacturers; and transmission means for sequentially transmitting the plurality of manufacturer identification information to a destination.

2. A communication apparatus according to claim 1, wherein each manufacturer identification information includes a respective manufacturer identifier, further comprising means for selecting first and second manufacturer identifiers from the manufacturer identification information; said transmission means sending the second manufacturer identifier in accordance with the first manufacturer identifier.

3. A communication apparatus according to claim 2, wherein said transmission means sends the first manufacturer identifier by an HDLC frame and the second manufacturer identifier by a non-HDLC frame.

4. A communication apparatus according to claim 1 wherein each manufacturer identification information includes a respective manufacturer identifier, and wherein said registration means registers each manufacturer identifier as an element of address information registered in a one-touch dial number and/or abbreviation dial number.

5. A communication apparatus according to claim 4, further comprising means for comparing dial information provided in a call with the pre-registered address information, and when they match, sending the manufacturer identification information corresponding to the address information.

6. A communication apparatus according to claim 1, wherein said transmission means sends a signal comprising an HDLC frame and a non-HDLC frame of equal data rate.

7. A communication apparatus according to claim 1, wherein each manufacturer identification information includes a respective manufacturer identifier, and wherein said transmission means sequentially sends signal frames while receiving responses and selects handlable manufacturer identifiers until a predetermined signal is received.

8. A communication apparatus according to claim 7, further comprising count means for counting a number of times of transmission of the serially sent signal frames and means for progressing the communication process without waiting for the reception of said predetermined signal when the number of times of transmission exceeds a predetermined number.

9. A communication apparatus according to claim 1, wherein each manufacturer identification information includes a respective manufacturer identifier, and wherein said transmission means continuously sends handlable manufacturer identifiers to the destination as a multi-frame on a protocol.

10. A communication apparatus according to claim 1, wherein each manufacturer identification information includes a respective manufacturer identifier, and wherein said transmission means sends as many non-standard functions including handlable manufacturer identifiers as the number of manufacturer identifiers in a protocol of a G4 facsimile.

11. A communication apparatus according to claim 1, wherein each manufacturer identification information includes a respective manufacturer identifier, and wherein said transmission means sends a manufacturer identifier of RSSP in CDCL/RDCLP negotiation in a protocol of a G4 facsimile when a manufacturer identifier sent in CSS of a layer 5 when a call is received is different from that of RSSP and the manufacturer identifier of RSSP is handlable.

12. A communication method comprising the steps of:
registering a plurality of manufacturer identification information for respectively identifying a plurality of manufacturers; and
sequentially transmitting the plurality of manufacturer identification information to a destination.

13. A communication method according to claim 12, wherein each manufacturer identification information includes a respective manufacturer identifier, further comprising a step of selecting first and second manufacturer identifiers from the manufacturer identification information,
said transmission step sending the second manufacturer identifier in accordance with the first manufacturer identifier.

14. A communication method according to claim 13, wherein said transmission step sends the first manufacturer identifier by an HDLC frame and the second manufacturer identifier by a non-HDLC frame.

15. A communication method according to claim 12, wherein each manufacturer identification information includes a respective manufacturer identifier, and wherein said registration step registers each manufacturer identifier as an element of address information registered in a one-touch dial number and/or abbreviation dial number.

16. A communication method according to claim 15, further comprising a step of comparing dial information provided in a call with the pre-registered address information, and when they match, sending the manufacturer identification information corresponding to the address information.

17. A communication method according to claim 12, wherein said transmission step sends a signal comprising an HDLC frame and a non-HDLC frame of equal data rate.

18. A communication method according to claim 12, wherein each manufacturer identification information includes a respective manufacturer identifier, and wherein said transmission step sequentially sends signal frames while receiving responses and selects handlable manufacturer identifiers until a predetermined signal is received.

19. A communication method according to claim 18, further comprising a counting step of counting a number of times of transmission of the serially sent signal frames and a step of progressing the communication process without waiting for the reception of said predetermined signal when the number of times of transmission exceeds a predetermined number.

20. A communication method according to claim 12, wherein each manufacturer identification information includes a respective manufacturer identifier, and wherein said transmission step continuously sends handlable manufacturer identifiers to the destination as a multi-frame on a protocol.

21. A communication method according to claim 12, wherein each manufacturer identification information includes a respective manufacturer identifier, and wherein said transmission step sends as many non-standard functions including handlable manufacturer identifiers as the number of manufacturer identifiers in a protocol of a G4 facsimile.

22. A communication method according to claim 14, wherein each manufacturer identification information includes a respective manufacturer identifier, and wherein said transmission step sends a manufacturer identifier of RSSP in CDCL/RDCLP negotiation in a protocol of a G4 facsimile when a manufacturer identifier sent in CSS of a layer 5 when a call is received is different from that of RSSP and the manufacturer identifier of RSSP is handlable.

\* \* \* \* \*

UNITED STATES PATENT AND TRADEMARK OFFICE
CERTIFICATE OF CORRECTION

PATENT NO. : 5,734,704
DATED : March 31, 1998
INVENTOR(S) : KAZUTAKA MATSUEDA ET AL.

It is certified that error appears in the above-identified patent and that said Letters Patent is hereby corrected as shown below:

<u>COLUMN 12</u>

Line 40, "1" should read --1,--.

Signed and Sealed this

Twenty-seventh Day of October, 1998

Attest:

BRUCE LEHMAN

*Attesting Officer*    *Commissioner of Patents and Trademarks*